3,176,009
HYDROLYSIS OF 1-ACYLATED-3-ACYLOXY BENZODIAZEPINES

Stanley C. Bell, Philadelphia, Pa., assignor to American Home Products Corporation, New York, N.Y., a corporation of Delaware
No Drawing. Filed Oct. 5, 1962, Ser. No. 228,726
4 Claims. (Cl. 260—239.3)

This invention relates to a method of hydrolyzing 1-acylated-3-acyloxy - 1,3 - dihydro-2H-1,4-benzodiazepin-2-ones to the corresponding 3-acylated or 3-hydroxy compounds.

In my co-pending application Serial No. 228,725, filed of even date herewith are disclosed and claimed novel acylated benzodiazepine compounds having the formula:

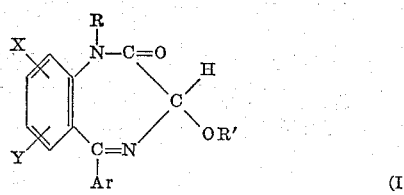

where Ar is an aryl radical such as phenyl, thienyl, or phenyl substituted by chlorine, fluorine, methoxy, methyl, or trifluoromethyl, X and Y each represents hydrogen or a substituent of the group consisting of chlorine, bromine, nitro, trifluoromethyl and methylsulfonyl, and R and R' are acyl radicals of monocarboxylic acids such as acetyl, propionyl, caproyl, benzoyl, toluyl, phenylacetyl, beta-phenylpropionyl and cinnamoyl, and haloacyl radicals such the chloroacetyl, chlorobenzoyl, and bromobenzoyl radicals, R and R' being the same or different.

In accordance with the present invention, it has been unexpectedly discovered that compounds of the Formula I above may be hydrolyzed in the presence of, or in the absence of, an inert solvent by means of an excess of a primary or secondary amine or with about 1 equivalent of hydrochloric acid or hydrobromic acid to give compounds devoid of the 1-acyl groups. The latter compounds may in turn be hydrolyzed to their corresponding 3-hydroxy derivatives by treatment with dilute alkali metal hydroxides. These reactions are shown below:

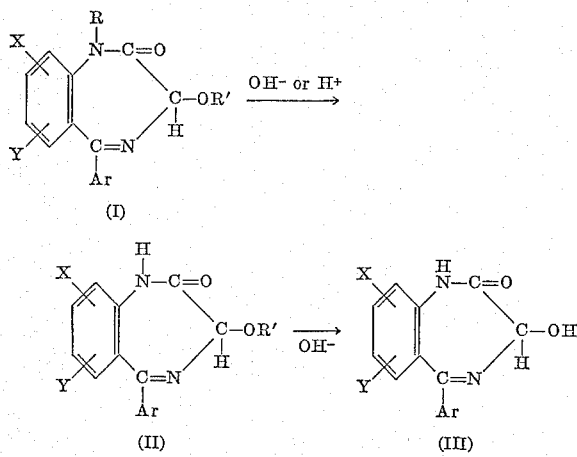

where X, Y, R', and Ar are as hereinabove stated.

Compounds of Formulae II and III are disclosed and claimed in my co-pending application, Ser. No. 177,174, filed March 5, 1962, and now abandoned.

These compounds have valuable anticonvulsant, and muscle-relaxing effects. Some of them exhibit sedative effects and some are tranquilizers without being sedatives. Certain of them have useful disinhibiting effects and increase libido.

In the first step of the invention where dilute hydrochloric or hydrobromic acid is used to remove the 1-acyl group, it is preferred to use an acid present in a lower alkanol solvent and to heat the reactants to the reflux temperature of the solvent. Where a primary or a secondary amine, such as propylamine or diethylamine is used, it is generally unnecessary to either use a solvent or to heat the reactants.

The following examples illustrate the practice of this invention:

Example 1

3-acetoxy-1-acetyl - 7 - chloro-5-(o-chlorophenyl)-1,3-dihydro-2H-1,4-benzodiazepin-2-one was refluxed for ½ hour in 100 ml. of alcohol containing 1 equivalent of hydrochloric acid. The reaction mixture was concentrated to a small volume and the precipitated 3-acetoxy-7-chloro-5-(o-chlorophenyl) - 1,3 - dihydro-2H-1,4-benzodiazepin-2-one was collected, M.P. 243–245°.

Example 2

To 20 ml. of diethylamine was added with stirring 6.0 g. of 3-acetoxy-1-acetyl-7-chloro-1,3-dihydro-5-phenyl-2H-1,4-benzodiazepin-2-one with the reaction mixture becoming warm. After 15 minutes, the reaction mixture was cooled and the product filtered and washed with alcohol giving pure 3-acetoxy-7-chloro-1,3-dihydro-5-phenyl-2H-1,4-benzodiazepin-2-one, M.P. 241–3°.

Example 3

To a suspension of 3.4 g. of 3-acetoxy-7-chloro-1,3-dihydro-5-phenyl-2H-1,4-benzodiazepin-2-one in 80 ml. of alcohol was added 6 ml. of 4 N sodium hydroxide. After complete solution had taken place a solid precipitated that redissolved upon the addition of 80 ml. of water. The solution was acidified with acetic acid to give white crystals. After recrystallization from alcohol, the compound 7-chloro-1,3-dihydro-3-hydroxy-5-phenyl - 2H-1,4-benzodiazepin-2-one melted at 203–204° C.

Example 4

7-chloro-5-(o-chlorophenyl) - 1,3 - dihydro-3-hydroxy-2H-1,4-benzodiazepin-2-one was prepared from 3-acetoxy-7-chloro-5-(o-chlorophenyl) - 1,3 - dihydro-2H-1,4-benzodiazepin-2-one according to the procedure of Example 3 and was isolated as a solvate with 1 mole of ethanol. When heated, it loses the ethanol of solvation and melts at 166–168° C.

Analysis.—Calcd. for $C_{17}H_{16}Cl_2N_2O_3$: C, 55.60; H, 4.39; N, 7.63. Found: C, 55.68; H, 4.20; N, 7.93.

Example 5

3-acetoxy-1,3-dihydro - 5 - phenyl-7-trifluoromethyl-2H-1,4-benzodiazepin-2-one is prepared from 6 g. 3-acetoxy-1-acetyl-1,3-dihydro - 5 - phenyl-7-trifluoromethyl-2H-1,4-benzodiazepin-2-one according to the procedure of Examples 1 and 2, using 1 equivalent of HCl and 20 ml. of diethylamine, respectively.

Example 6

1,3-dihydro-3-hydroxy - 5 - phenyl-7-trifluoromethyl-2H-1,4-benzodiazepin-2-one is prepared from 3.4 g. of 3-acetoxy-1,3-dihydro - 5 - phenyl-7-trifluoromethyl-2H-1,4-benzodiazepin-2-one by hydrolyzing with 6 ml. of 4 N sodium hydroxide, according to the procedure of Example 3.

What is claimed is:
1. The method which comprises treating with a reagent selected from the group consisting of primary amines, secondary amines, hydrochloric acid and hydrobromic acid a compound having the formula:

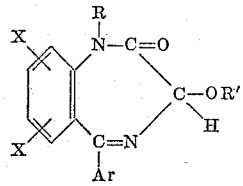

where X and Y are each selected from the group consisting of hydrogen, chlorine, bromine, nitro, trifluoromethyl and methylsulfonyl; Ar is selected from the group consisting of phenyl, thienyl and phenyl substituted by a radical selected from the group consisting of chlorine, fluorine, methoxy, methyl and trifluoromethyl; and R and R' are the acyl radicals of monocarboxylic acids, to form a product having the formula:

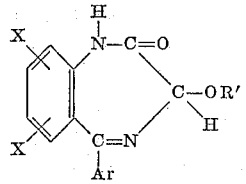

where Ar, X, Y, and R are as hereinabove stated.

2. Method according to claim 1, wherein said reagent is diethylamine.

3. Method according to claim 1, wherein said reaction is carried out in a lower alkanol solvent.

4. Method according to claim 1, wherein said product is further treated with dilute alkali metal hydroxide to form a product having the formula

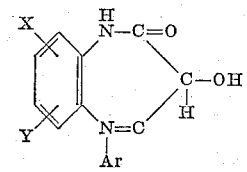

wherein X, Y and Ar are as stated in claim 1.

References Cited in the file of this patent

Wagner et al.: Synthetic Organic Chemistry (New York, 1953), pages 169–70, 568–9 and 678–9.

UNITED STATES PATENT OFFICE
CERTIFICATE OF CORRECTION

Patent No. 3,176,009              March 30, 1965

Stanley C. Bell

It is hereby certified that error appears in the above numbered patent requiring correction and that the said Letters Patent should read as corrected below.

Column 3, lines 3 to 10, and lines 19 to 25, for the left-hand portion of the formulae reading:

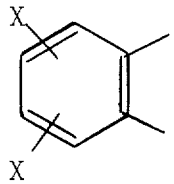     read     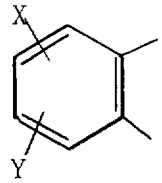

Signed and sealed this 28th day of December 1965.

(SEAL)
Attest:

ERNEST W. SWIDER              EDWARD J. BRENNER
Attesting Officer                Commissioner of Patents